July 19, 1927.
C. R. McCUNE
1,636,100
CAR JOURNAL
Filed Feb. 14, 1923
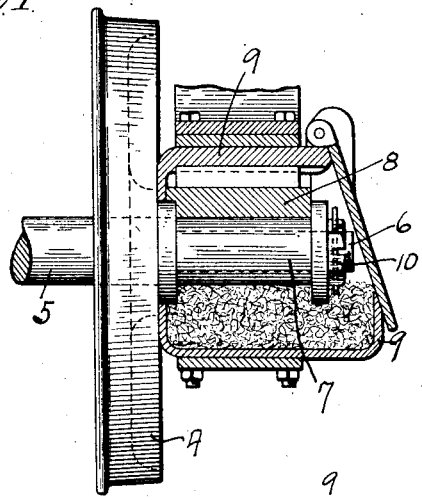
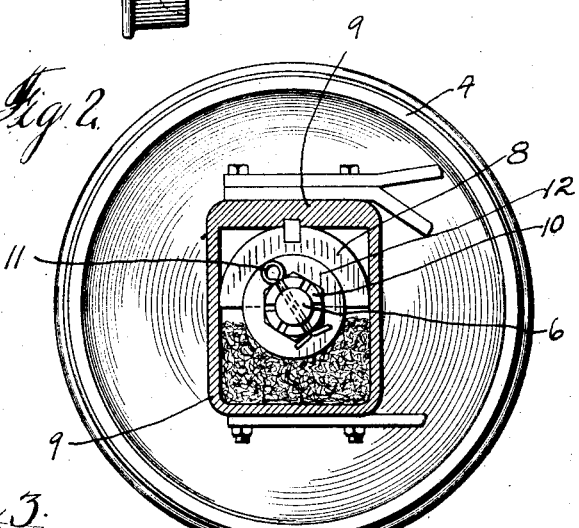
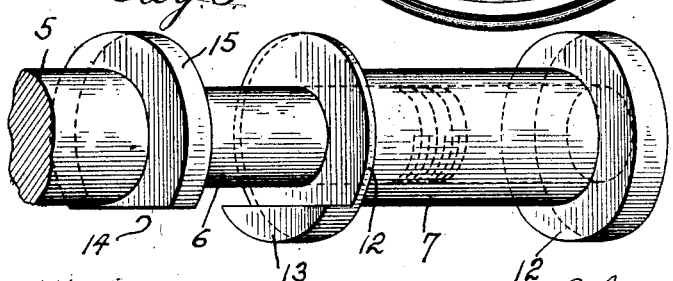
Witness:
Dave S. Magnusson.
Inventor:
Challen R. McCune
By Nissen & Crane Attys.

Patented July 19, 1927.

1,636,100

UNITED STATES PATENT OFFICE.

CHALLEN R. McCUNE, OF CLINTON, IOWA.

CAR JOURNAL.

Application filed February 14, 1923. Serial No. 618,914.

My invention relates to car journals such as used on railway cars, street cars, and the like, and has for one of its objects the provision of a simple and efficient construction so that the journal surface of railway car axles, and the like, may be easily and quickly renewed.

A further object is the provision of a removable journal sleeve which can be easily and quickly removed and which can be held for efficient use.

Other objects will appear hereinafter.

An embodiment of my invention is illustrated in the accompanying drawing forming a part of this specification and in which—

Fig. 1 is a view partially in section showing a railway car wheel and axle and its mounting equipped with my invention;

Fig. 2 is a view taken on line 2—2 of Fig. 1; and

Fig. 3 is an enlarged view in perspective showing the journal sleeve partially removed from its end of the car axle.

Referring more particularly to the drawing, I have indicated a car wheel 4 fitted on an axle 5. The wheel 4 may be attached to the axle 5 in the usual or in any preferred manner. The axle 5 may have any desired construction and is formed on its ends, one of which is shown at 6, smaller than the usual car journal so as to receive the sleeve 7 of my improvement. It will be understood, however, that the cross-section of the axle part 6 and sleeve 7 may be of any desired size. I preferably arrange the sleeve 7 of a size and shape so that it will fit the conventional brasses 8 and other parts of the bearing box 9. With this arrangement axles may be equipped with my improvement without the necessity of changing over any other part of the construction.

The sleeve 7 may be held on the axle part 6 by a nut 10 or in any other desired manner. I have shown the nut 10 threaded on the end of shaft 6 against the end of sleeve 7 and held against retrograde movement by a key 11. The nut may be locked in any other desired manner.

At the ends of the sleeve 7 are peripheral extensions 12 which may be of sizes corresponding to the conventional peripheral flanges on axles now in use so as to fit the conventional bearings. The sleeve 7 is held positively against turning on the axle by a lug 13 engaging a cut-away portion 14 of a flange 15 on the axle 5. It will be understood that while I have shown but one projection 13 and cutaway portion 14, the number of these parts may be varied as desired, or, other means for holding the sleeve against turning on the axle may be provided when desired. With the construction illustrated the projection 13 is substantially the size of the cut-away portion 14 so that when the projection 13 is in the cut-away portion 14 the flanges 12, 13 and 15 adjacent the wheel will be substantially cylindrical and of a size to fit the bearing it is to be used with, substantially as indicated in Fig. 1.

The axle 5—6 and the sleeve 7 may be formed of any desirable materials so that should the parts 6 and 7 become heated in use the part 7 may yet be easily removed. The parts 6 and 7 may be formed of similar quality of steel and since they both expand with substantially the same co-efficient of expansion the sleeve may be easily removed upon removing the nut 10.

With this construction the sleeve 7 can be replaced by a new one with a minimum amount of effort and can be renewed without the necessity of taking the car to the repair shop. It is only necessary to jack up the truck so as to take the weight off of the axle and then the sleeve 7 can be easily removed and a new one put in place while renewing the brass 8 or at any time desired.

I claim:—

In combination, a car axle, a journal bearing for said axle, a flange on said axle, a bearing sleeve having flanges at opposite ends thereof and having an opening therethrough for receiving the end of said car axle, one of the flanges on said sleeve having a projection thereon for engaging the flange on said axle to prevent rotation of said sleeve about said axle when said sleeve is fitted over the end of said axle, the flanges on said sleeve being spaced to engage opposite ends of said journal bearing, a nut for engaging the projecting end of said axle when said sleeve is in position thereon, and means for locking said nut against rotation, said sleeve and axle being made of similar quality steel to insure the same coefficient of expansion for said parts.

In testimony whereof I have signed my name to this specification on this 3rd day of January, A. D. 1923.

CHALLEN R. McCUNE.